United States Patent [19]

Cheah

[11] Patent Number: 5,710,821
[45] Date of Patent: Jan. 20, 1998

[54] AUDIO COMMUNICATIONS SYSTEM WITH BUILT IN EXPANSION CAPABILITY FOR A DESKTOP COMPUTER

[75] Inventor: Chris Cheah, San Jose, Calif.

[73] Assignee: Sound Minds Technology, Inc., Campbell, Calif.

[21] Appl. No.: 152,305

[22] Filed: Nov. 12, 1993

Related U.S. Application Data

[63] Continuation-in-part of Ser. No. 899,739, Jun. 17, 1992, abandoned.

[51] Int. Cl.⁶ .................................................. H04R 1/02
[52] U.S. Cl. ........................... 381/90; 381/159; 181/156; 181/199
[58] Field of Search .................... 381/88, 90, 188, 381/205, 159; 181/144, 145, 148, 152, 156, 199

[56] References Cited

U.S. PATENT DOCUMENTS

| 5,020,926 | 6/1991 | Wilhelm | 400/54 |
|---|---|---|---|
| 5,119,497 | 6/1992 | Freige et al. | 395/750 |
| 5,481,616 | 1/1996 | Freadman | 381/24 |

FOREIGN PATENT DOCUMENTS

| 1-216700 | 8/1989 | Japan | 381/24 |

OTHER PUBLICATIONS

Advertisement for "Twin Sound™," by Sound Minds Technology, 1992.

Primary Examiner—Forester W. Isen

[57] ABSTRACT

A high quality sound system for installation into the bay of an existing computer including a front panel supporting a pair of speakers. A sound focussing isolation unit having a mouth opening up on the front panel is positioned between the speakers and has a throat communicating with a reverberating chamber provided by a housing located in the bay of the computer. The focussing isolation unit is constructed to prevent sound waves generated by one speaker from destructively interfering with sound waves generated by the other speaker. It also dampens mechanical vibrations of the front panel. The focussing isolation unit also focusses sound from the reverberating channel located in the bay space out through a mouth located in the front channel. Each channel is provided with an individual amplifier for two channel reception. Power to the amplifiers is provided from the computer power supplies which is first filtered to reduce noise to the amplifier circuits. Selected impedance matching is provided between the amplifiers and any third party sound signal source.

20 Claims, 14 Drawing Sheets

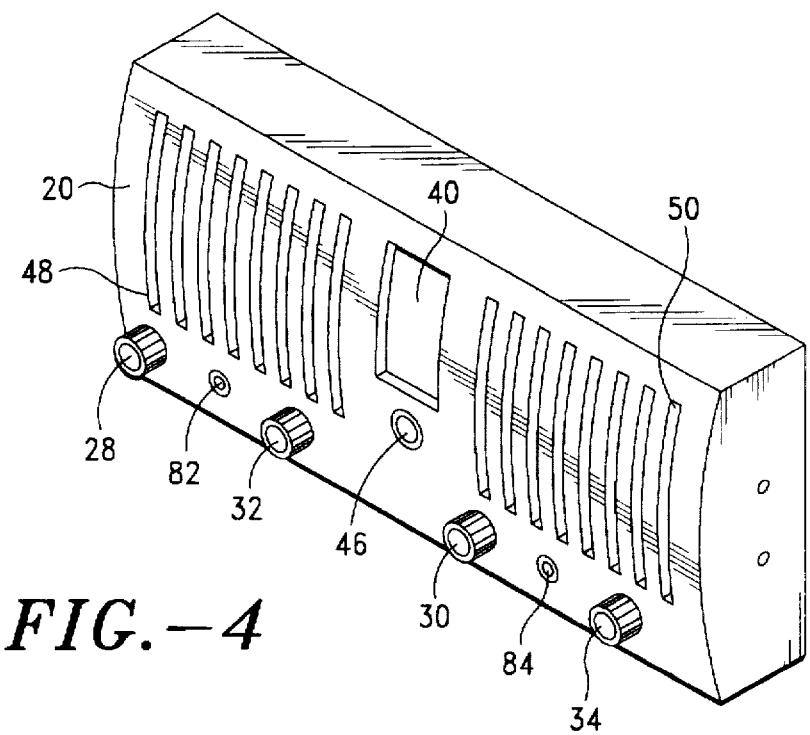
FIG.—4
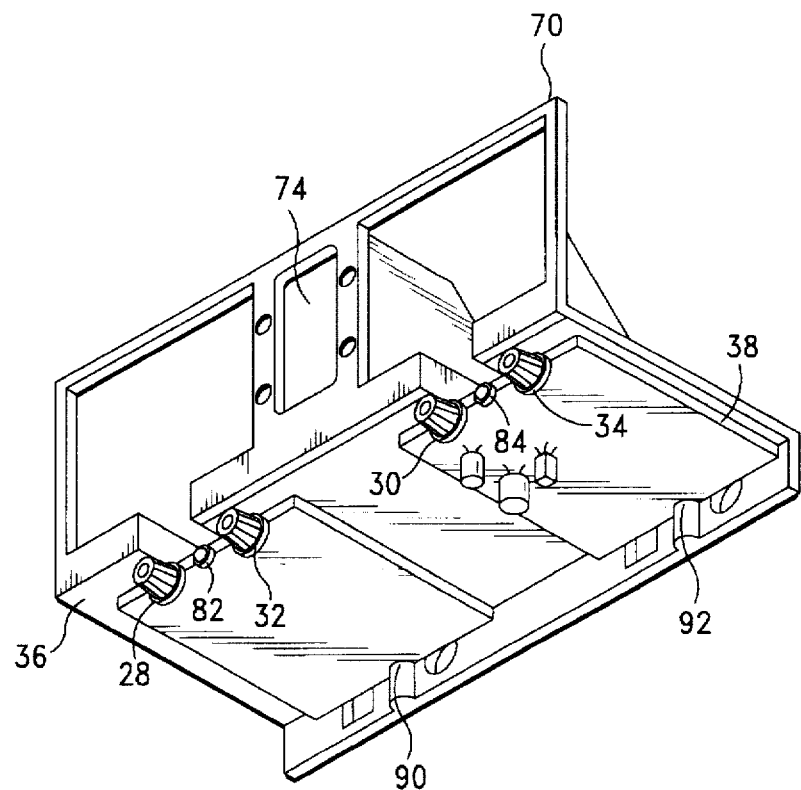
FIG.—6

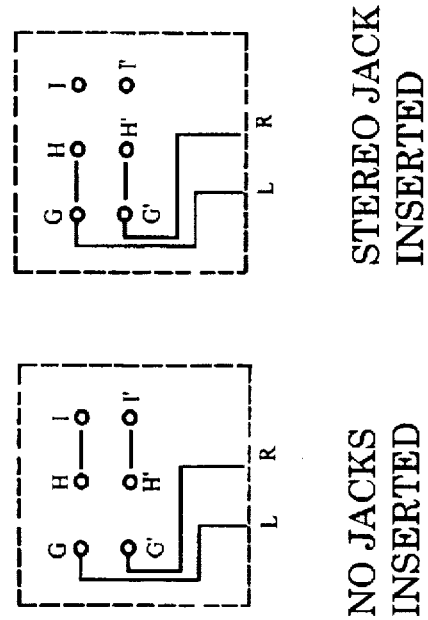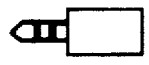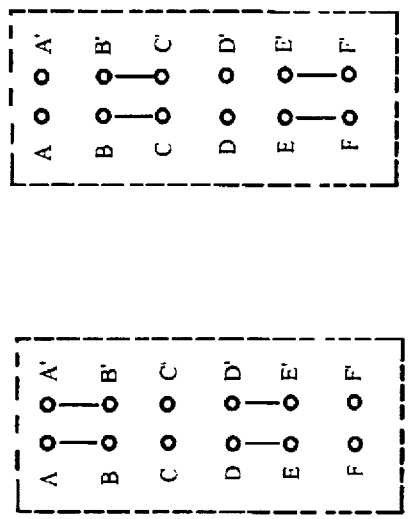
Fig. 19B

AUDIO COMMUNICATIONS SYSTEM WITH BUILT IN EXPANSION CAPABILITY FOR A DESKTOP COMPUTER

CROSS-REFERENCE TO RELATED APPLICATION

This is a Continuation-In-Part of U.S. application Ser. No. 07/899,739 filed Jun 17, 1992, now abandoned.

BACKGROUND

1. Field of Invention

This invention relates to audio speaker systems and particularly to an audio speaker system that may be incorporated into a desktop computer.

Specifically this invention relates to a methodology for creating a stereo audio system for a typical desktop computer through enclosing, partitioning and isolation of the air space found in a typical drive bay of a computer for use as reveberation chambers and the added use of application specific modular expansion cards and transducer adaptors to further expand on the basic audio functionality of the system.

2. Prior Art

The study of duplication and amplification of an original sound has resulted in the development of techniques that are well known to the public. These techniques include, in some instances the use of two or more speakers wherein each speaker is constructed to have favorable characteristics in a particular frequency range so that the entire frequency spectrum is addressed by a bank of speakers. Stereophonic sound techniques have been developed including identical but separated amplifier structures each of which independently amplify the right or left channel, respectively, associated with a stereo source input. A third technique includes the design of appropriately configured chambers or resonators that enhance desired audio effects.

U.S. Pat. No. 4,462112 to Watanabe discloses a two speaker system and a switch for selectively connecting one of the speakers to an input through a volume controller so that, in response to the switching action of the switch two speakers may operate as twin drive woofers (designed to reproduce bass frequencies) or the former one of the two may operate as a passive radiator.

U.S. Pat. No. 4,969,196 to Nakamura is for a vertical array of speakers and a vertical array of horns formed in a baffle case. Each speaker is provided with its own baffle and horn, the baffle positioned over the back of the speaker and communicating with the throat of the horn. All horns are joined into a common mouth.

U.S. Pat. No. 4,535,473 to Ward is for a portable case supporting at least one speaker and associated battery and components.

U.S. Pat. No. 4,332,986 to Butler is for a speaker system comprising a speaker enclosure standing on legs thereby defining an open space between the bottom wall of the enclosure and the floor. A port in the bottom wall permits the enclosure to communicate low frequency sound to the open space.

U.S. Pat. No. 4,251,687 to Deutcsch discloses a housing defining a chamber with an acoustic opening in which a speaker diaphragm is disposed and another opening in said chamber through which the chamber communicates with the throat of a horn to form a resonant system.

U.S. Pat. No. 5,020,926 to Wilhelm discloses a printer mounting assembly arrangement whereby a printer is designed to fit into a disk drive bay of a computer. The invention supposedly allows the printer subassembly to become an integral part of the computer for easy transport and also affords protection to the assembly from abuse. Wilhelm's printer assembly does not care if a volume of air is present in the drive bay that may be enclosed to form reveberating chambers for use by a pair of speakers.

Japanese patent 63-41102 to Fujihara discloses a stand-alone cabinet assembly containing two speakers arranged between a plural arrangement of partitioning plates with prescribed slits. Fujihara's invention is only concerned with optimally passing the desired frequencies to the desired channel through arrangements of plural partition plates with slits spaced between the speakers.

The Wilhelm and Fujihara patents do not allow for application specific modular expansion cards or transducer adapters to be adapted to the assembly for purposes of easily expanding beyond the basic functionality of the invention.

Simple speakers that functions as beepers are commonly found in computers such as an IBM or clone PC (XT,AT) or Macintosh.

Until recently, there was no need or demand for stereo sound systems. However, the situation has changed in today's multimedia computing market. The introduction of the compact disk ROM (CD-ROM) drive and the ability to digitise and play back digital sound has resulted in the need for stereo sound in computer technology.

As illustrated in FIG. 1A, current computer users rely on separated stereo boxes to enjoy stereo sound. These external stereo structures need either solid state batteries or an external AC power adapter for power requirements. The requirement for all of these components and the external wiring for power and signals arrayed around the computer presents, at the very least, an inconvenience to the user in terms of orderliness in the users work place.

Some recent computer manufacturers incorporate stereo speakers into the chassis of their computers by redesigning the chassis (FIG. 1B). However, redesign of the chassis and retooling its manufacture is expensive. Furthermore, it does not address the current market of computer users who desire to add stereo sound capability to their computer system. These users would find it desirable to acquire an integrated stereo structure, engineered for the specific task of providing the computer with optimum quality stereo sound, that could conveniently, economically and neatly be incorporated into their existing computer environment.

THE INVENTION

OBJECTS

It is the object of this invention to provide a compact high quality stereo sound system for use with a personal computer.

It is a further object that this system provide high quality sound reproduction that characterizes stereo sound systems.

It is a further object that this system can be conveniently installed into the chassis of typical present computers that were not originally designed with the intention to accommodate a stereo sound system.

It is a further object that the ease of installation be comparable to installing a disk drive into a computer.

It is another object that installation of the stereo sound system require no modification to the computer chassis.

It is another object that the system contains a stereo headphone jack and independent volume, power On/Off and impedance matching controls that are readily accessible to the user.

It is another object to allow for the system to substitute the original PC speaker resulting in the ability to control the volume of the new PC speaker that hitherto was not possible.

It is a further object of the system to include Light Emitting Diodes that provides multiple functions such as an aesthetically pleasing flashing light that is frequency modulated with the input audio, an indication that power is supplied to the system and as flashing light indicators for alarms or electronic mail/voice mail messages sent to the system.

It is another object to power the system with the existing power supply of the computer thereby eliminating the need for an extraneous power supply.

It is a further object that the system functionality be able to expand through the addition of application specific modular expansion cards inserted into the enclosure.

It is a further object that the system be able to establish protocol communications with the external computer by means of a application specific modular expansion card.

It is a further object that the expanded functionality include but not limited to infra-red, radio, wireless, telephony, digital signal processing, electronic encryption, memory, accelerators and optically transmitted means.

It is a further object that the stereo system assembly be easy, quick and require a minimum number of manufactured parts.

SUMMARY

This invention is directed towards a sound system that can be installed directly into the drive bay of typical computer in which speakers and components of the system are selected, engineered and arranged in combination with the inherent acoustical characteristics of the existing bay to produce the rich mellow sound that characterizes a high quality stereo sound system. The construction of this sound system is based on my observations that: a.) the majority of desktop computers have a minimum of 4 drive bays of which only three are used; there is always one vacant so called half height disk drive that is unused and b) the average desktop computer measures no more that eighteen inches breadth and the average user sits about the same distance from the computer, a pair of speakers, closely adjacent to one another, provides the same quality of stereophonic sound as the same speakers separated by eighteen inches.

Accordingly, the sound system of this invention includes a pair of speakers separated by a horn which are supported by a front panel to the unit extending into the bay. The horn has a throat flaring out from the rear of the front panel to a mouth located at the front panel between the speakers. Sound is radiated from the rear surface of the speaker diaphragms to the chamber formed by the walls of the back panel, then reverberates back through the horn and emanates from the mouth of the horn to reinforce sound radiated directly from the front surfaces of the speaker diaphragms.

The system is also designed to provide a means for substituting the original PC speaker such that it is now possible to control the volume of the PC speaker. The system is also designed to accept multiple audio sources (front, back and PC speaker) and is also designed to accept both a line level audio input or a small signal input from a microphone, both plugged into the same front stereo jack.

Each speaker is provided with its own channel including an amplifier for input from a third party two channel stereo output system.

An additional feature of the invention is the ability to selectively match the output impedance of any third party audio board output to the input impedance of the amplifier boards, for maximum impedance matching.

The invention is designed for easy upgrade from the basic audio functionality through the use of application specific expansion cards (eg. Fax/Data/Voice Modem, Solid State Memory, Telephony, radio etc.) plus the system can also be configured to complement the basic audio functionality through the use of specific transducer adapters (e.g wireless, optical lens) plugged onto the front panel.

DRAWINGS

FIG. 4 shows a perspective front view of the front panel.

FIG. 6 shows a perspective bottom view of the multifunction frame.

FIG. 19B shows switching positions of the 4P2T switch and the 2P2T jack.

DRAWING REFERENCE NUMERALS

Figure 1A:
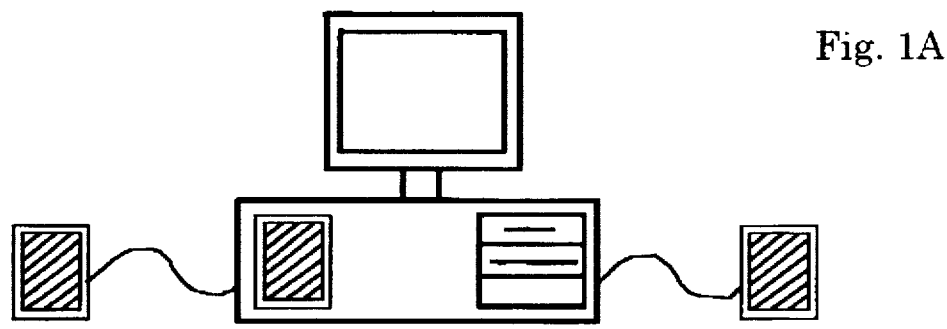
FIG. 1A shows a computer system of the prior art with an external separated computer system
Figure 1B:
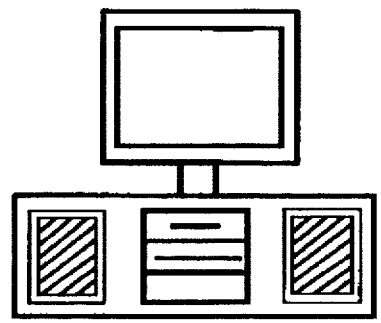
FIG. 1B shows a prior art computer system in which that chassis has been redesigned to include separated speakers.
Figure 2:
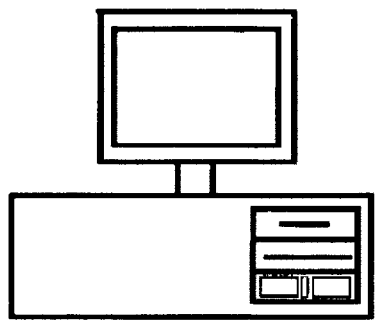
FIG. 2 shows a front view of an embodiment of the speaker system according to present invention.

10 Integrated sound system
12 Half height disk drive bay
14 Computer chassis
20 Front panel to 10
22 Back panel to 10
24 Right speaker 26 Left speaker
28 Right On/Off & Volume control switch
30 Left On/Off & Volume control switch
32 Right Hi/Lo impedance select switch
34 Left Hi/Lo impedance select switch
36 Right amplifier circuit
38 Left amplifier circuit
40 Center duct
46 Stereo headphone jack
48 Right speaker grill
50 Left speaker grill
60 Power input connector
62 Signals input connector
70 Multifunction frame
72 Focussing channel
74 Focussing hole
76 Left divider wall
78 Right divider wall
82 Right L.E.D indicator
84 Left L.E.D indicator
90 Right holding bar
92 Left holding bar
94 Right channel power receptacle
96 Left audio channel receptacle
98 Right audio channel receptacle
100 Left channel power receptacle

DRAWING REFERENCE NUMERALS

208 Integrated audio communications system
210 Top cover
212 bottom base
214 electronic circuit board
216 circuit board top mounting boss holes
218 front bottom isolation and support
219 right indentation
220 right speaker glider groove
221 right mold dimple
222 left speaker glider groove
224 back bottom isolation and support
226 back bosses
228 power receptacle lock
230 side mounting screw holes
235 front top isolation flap
236 front bosses
238 right speaker
239 top side flaps
240 left speaker
242 bottom bosses
244 rear stereo input jack
245 left reveberating chamber
234 right reveberating chamber
246 rear PC speaker input jack
247 rear power receptacle hole
248 rear stereo microphone output Jack
250 stereo headphone output jack
252 Left LED
254 Direct driven/Amplifier switch
256 Left volume control
258 Right volume control
260 PC speaker/Sound Board switch
262 Right channel LED
264 Microphone/audio input jack
266 Front modular expansion card access opening
268 Built in honeycomb holes
269 Front panel
270 Transducer Adapter Mount
272 Modified metal bracket
274 application specific modular expansion card
276 optical lens
280 rear modular expansion card access opening

DESCRIPTION OF A PREFERRED EMBODIMENT

The following description presents various adaptations and modifications of the invention including what I presently believe to be the best mode for carrying out the invention.

Figure 3:
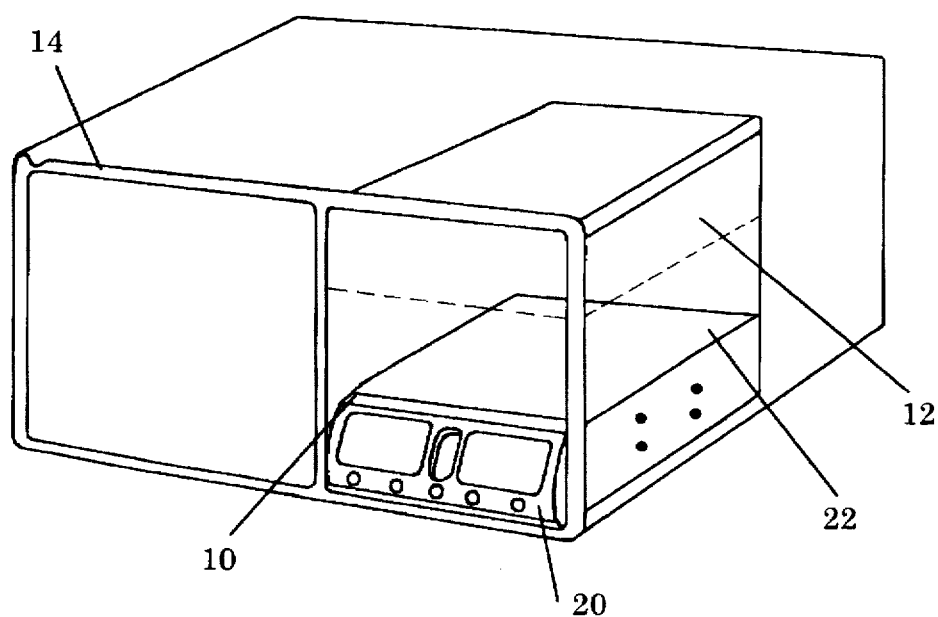
FIG. 3 shows a perspective side view of an embodiment of the speaker system according to the present invention.

FIG. 3 shows in perspective, a front view of the sound system 10 including the front panel 20 and the back panel 22, which together forms the integrated sound system 10. The sound system 10 is secured in the existing half height computer bay 12 by mounting holes along the sides of back panel 22 to the computer chassis 14. This is a preferred embodiment of the speaker system for installation into an existing drive bay.

Figure 7:
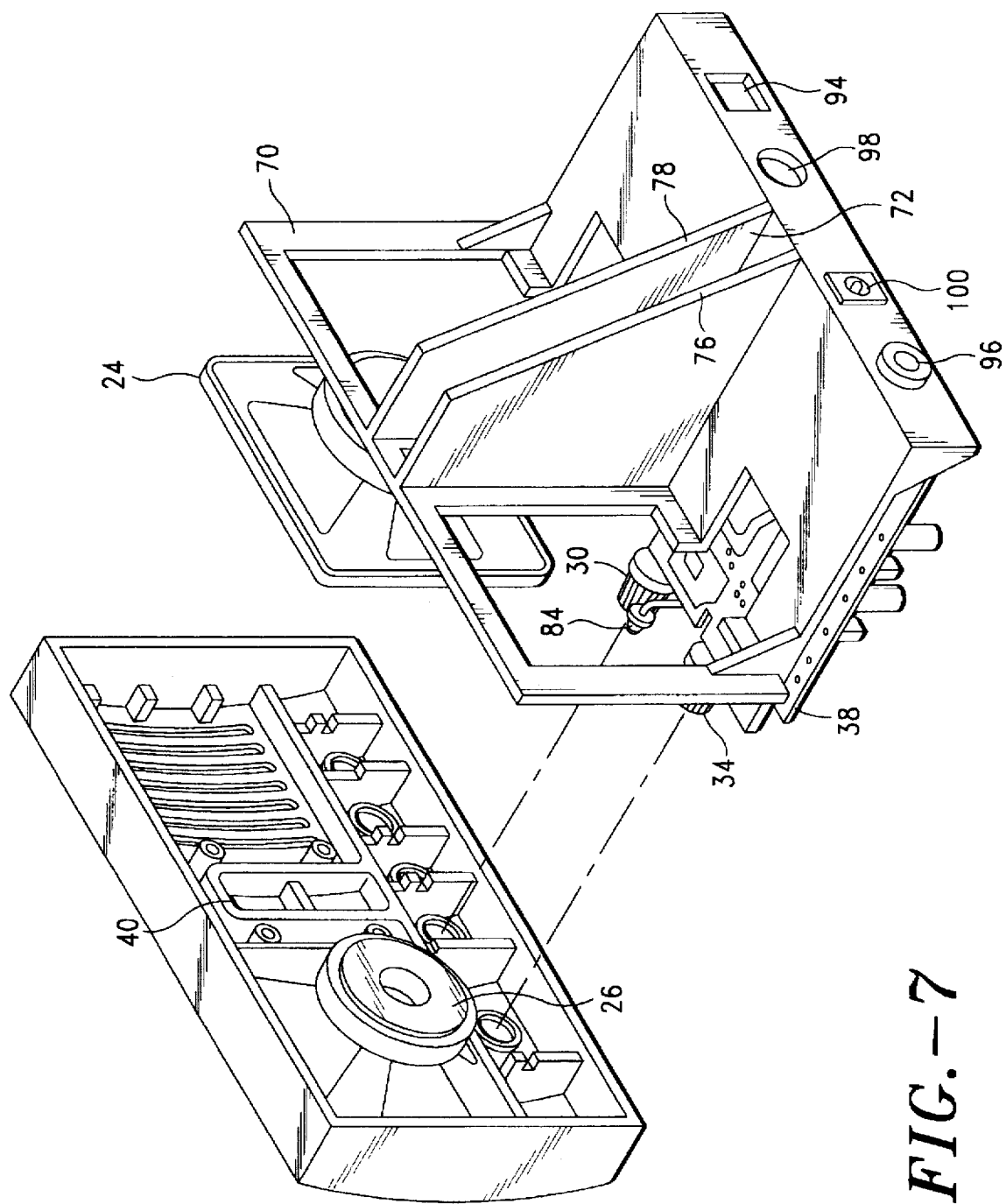
FIG. 7 shows an exploded side view of the front panel and the multifunction frame.

FIG.4 shows a perspective front view of the front panel 20. Front panel 20 has right and left grill openings 48 and 50 for right and left speakers 24 and 26 (FIG.7) respectively. Light emitting diodes 82 and 84, On/Off power & volume control switches 28,30, Hi/Lo impedance select switches 32,34 are all accessible through aligned holes in front panel 20. An opening, center duct 40 is situated between right and left grill opening 48,50. Stereo headphone jack 46 sits just below center duck 40.

Figure 5A:
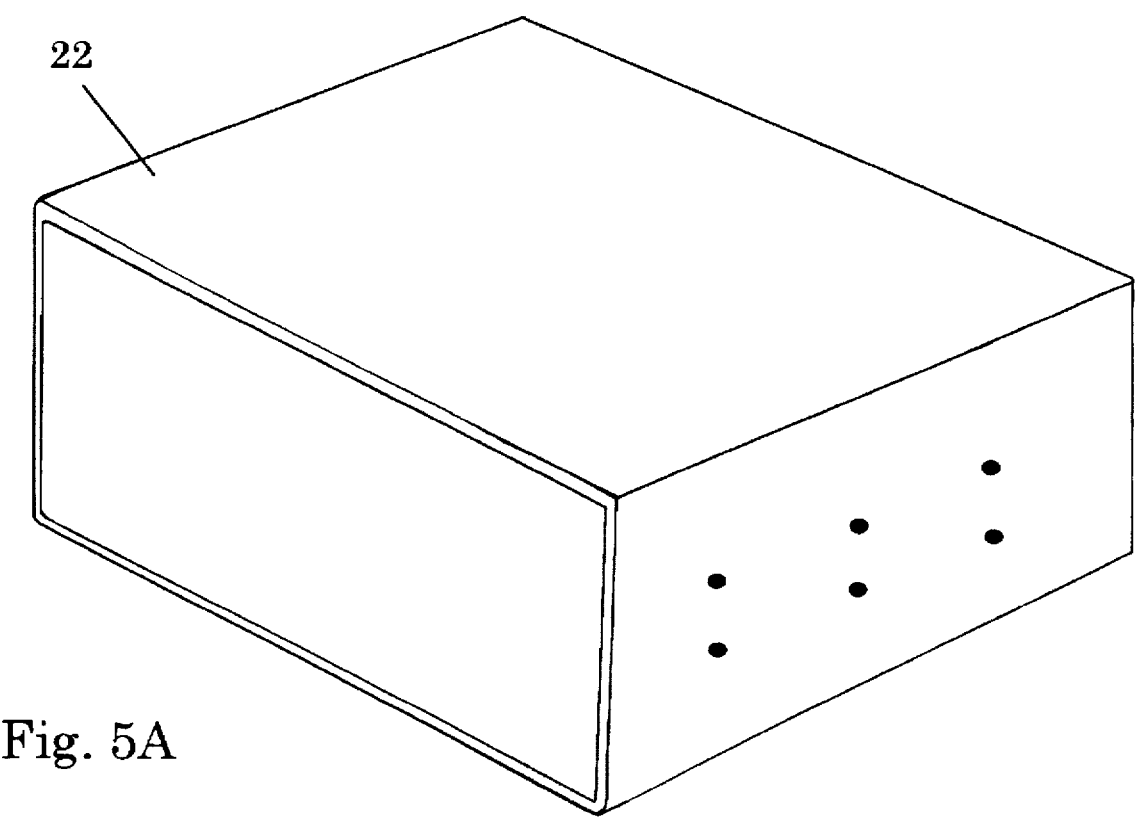
FIG. 5A shows a perspective front view of the back panel 22.
Figure 5B:
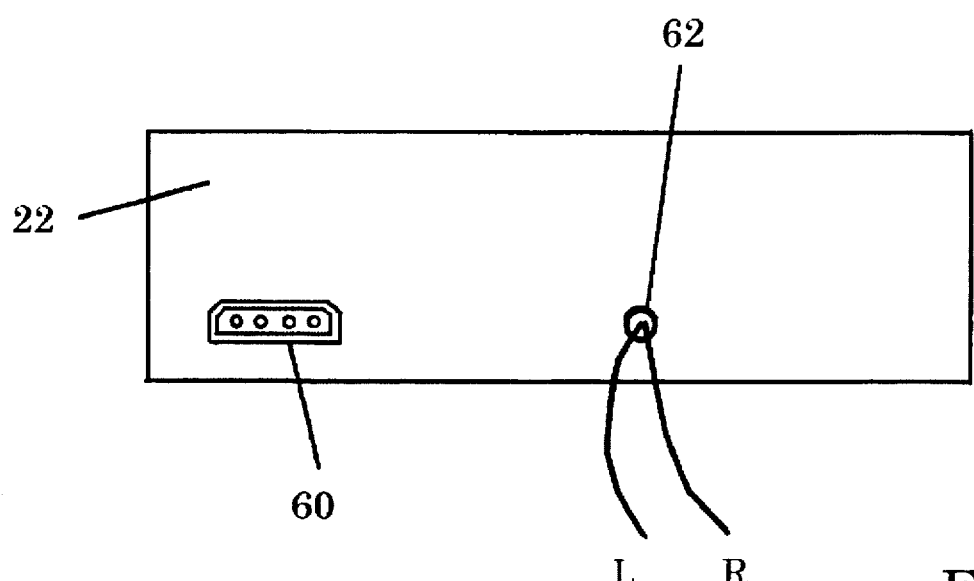
FIG. 5B shows the back of back panel 22.

FIG. 5A shows a perspective front view of the back panel 22. The back panel 22 has power input connector 60 and a signal input connector 62 located at its back (FIG. 5B). The back panel 22 is secured to the front panel 20 by mounting screws at the sides.

FIG. 6 shows a bottom perspective view of the multifunction frame 70. The multifunction frame performs several functions, including:

1. Locking amplifier boards 36,38 in place using holding bars 90,92 at the back and similar locking bars at the inside of front panel 20.

2. Mounting the speakers 24,26 to rest on the inside of front panel 20, then securing the speakers 24,26 and amplifier boards 36,38 by mounting focussing hole 74 over center duct 40 and securing with four screws at bosses shown. This interlocking of the speakers 24,26 and amplifier boards 36,38 to the multifunction frame 70 and front panel 20 prevents deleterious mechanical vibrations of the speakers from affecting the natural vibrations produced by the vibrating diaphragms of the speakers.

3. Positioning the dividing walls 76,78 to prevent destructive interference between back radiating sound waves at the vicinity of the speakers 24,26 so that these sound waves have a chance to echo in the reveberating chamber of back panel 22.

4. Forming a focussing channel 72 between the separation of the dividing walls 76,78 that focusses reverberated sound waves from the back panel 22 to the user space at the front through center duct 40, thereby improving the quality of low frequency sound.

Power to the circuit boards 36,38 are input to the sound system 10 at the power input receptacles 94,100. Similarly the independent audio channels are connected to the circuit boards 36,38 at the audio receptacles 98,96 respectively.

Amplifier boards 36,38 contains both low noise amplifier circuits and power supply noise filtering circuits to ensure that the normally noisy power supply environment of the computer does not corrupt the audio amplifier characteristics.

Operation

The front panel 20 has independent combined On/Off & Volume controls 28,30 per audio channel. The circuit boards 36,38 are designed to be identical for easy manufacture. When the On/Off & Volume control switch is in the Off position, the corresponding amplifier board is disabled and the corresponding speaker is driven directly by the input sound channel. This is useful in cases where an amplifier is already available on a third party audio source. This is the direct mode. Light Emitting Diodes 82,84 are also disabled in this mode.

When the On/Off & Volume control switch is in the On position, the potentiometer value determines the amount of amplification. L.E.Ds 82,84 gives a visual representation of the selected speaker channel. Each amplifier board also has a Hi/Lo select switch. In the Lo position, the amplifier is designed to accept a low impedance signal source of less than five ohms, thereby effectively matching low impedance signals sources from devices such as compact disks and sound boards. In the Hi position, the amplifier is designed to match a high impedance signal source of output impedance greater than two hundred ohms. This combination of Lo/Hi impedance selection capability makes the system very flexible.

The stereo headphone jacks allow the user to disable the speakers where a quiet environment is observed but still allows the user to enjoy stereophonic sound.

As the speakers vibrate, forward vibrations of sound waves is directed at the user through grills 48,50. The backward motion of the diaphragms causes sound to radiate backwards. The two divider walls 76,78 provides isolation to the vibrating sound waves in the vicinity of the speakers. These sound waves then travel to the relatively deep back panel 20 where reveberation takes place. the resultant echoed sound is channeled back to the front user space through the focussing channel 72. A good quality sound is due in part by the reproduction characteristic of the echo chamber.

A typical computer compartment for a half height drive measures some six inches wide, seven inches deep and just over one and a half inches high, resulting in a volume of roughly sixty cubic inches. This sound system makes novel use of this significant volume of air that when enclosed by a back panel 22 forms a reveberating chamber that provides a good quality sound system. The reflected echoed sound emanating between the closely spaced speakers further enhances the stereo effect, even though the speakers are only two inches apart.

Figure 8A:
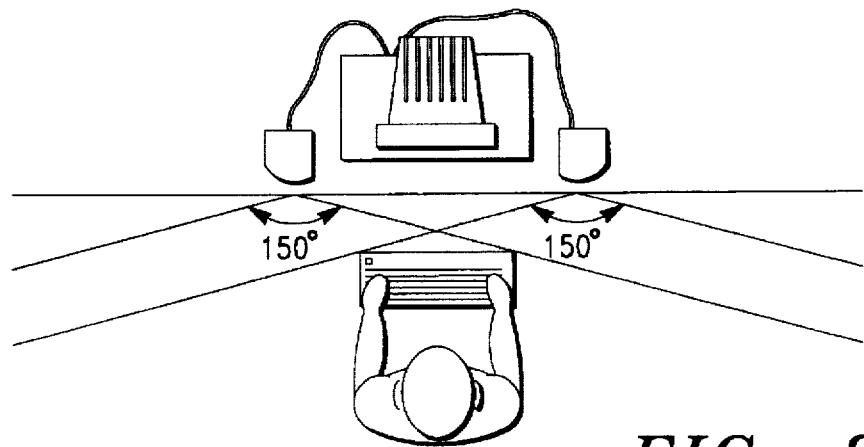
FIG. 8A, 8B, 8C shows illustrations of the physical principles of the invention.
Figure 8B:
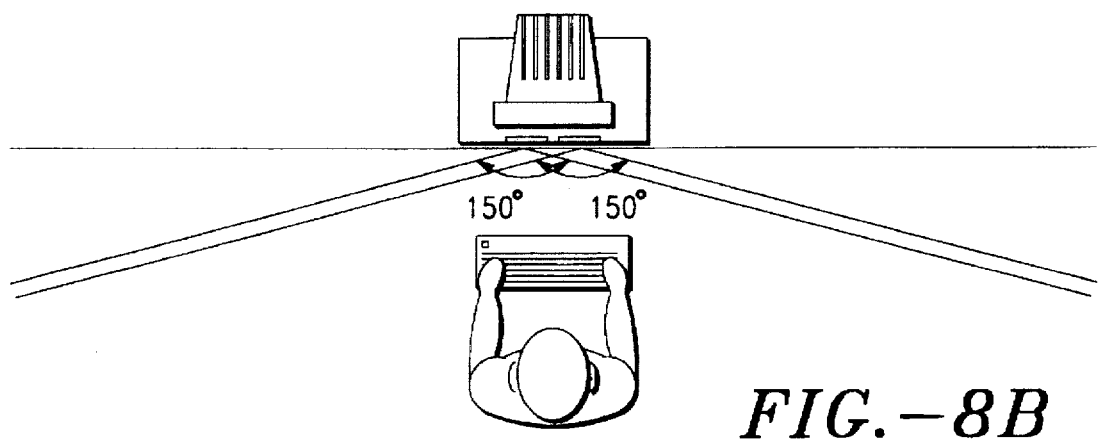
Figure 8C:
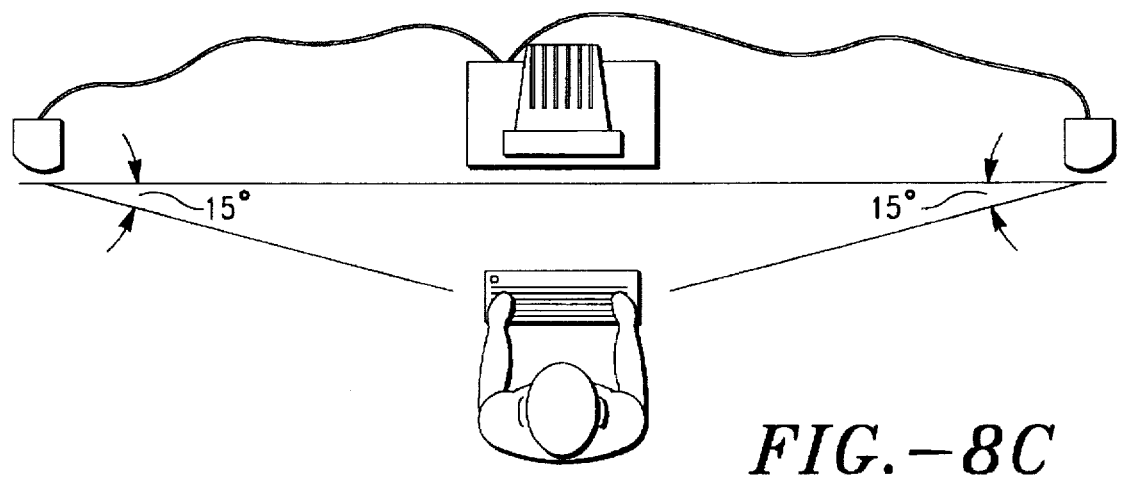
Figure 9:
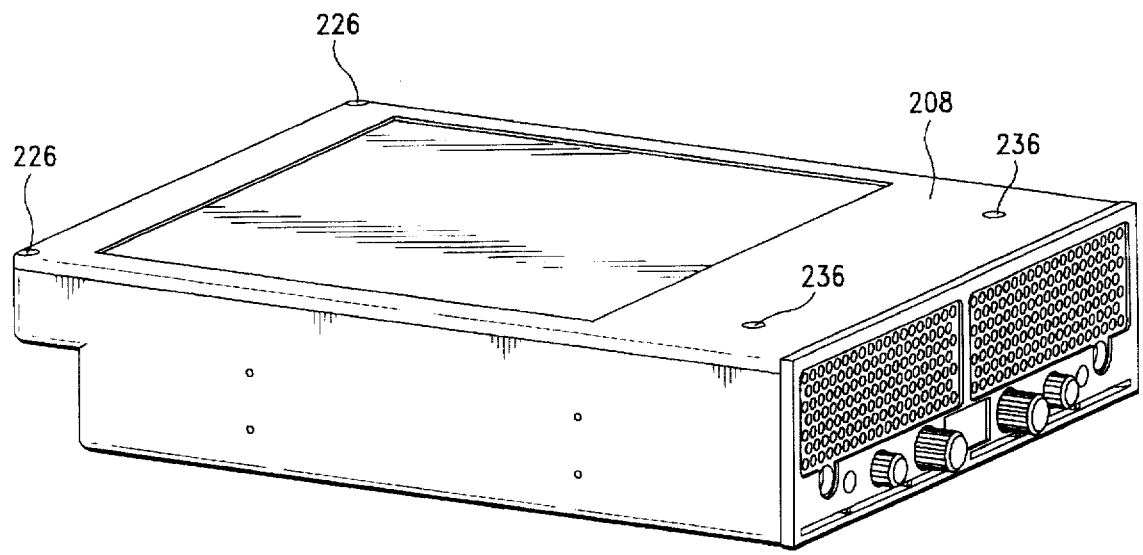
FIG. 9 shows a front perspective view of an embodiment of the speaker system according to the present invention.

Although I do not wish to be bound by theory, FIG. 8A, FIG.8B and FIG. 8C illustrates my theory as to why the sound system of my invention reproduces sound that has a quality equivalent or better than stereo sound produced by speakers spaced at eighteen inches apart.

FIG. 8A shows a top view of a drawn to scale computer user sitting eighteen inches from a computer having a separated stereo speakers eighteen inches apart. Allowing a hundred and fifty degree propagating sound wave from a point from each speaker will show that all around the immediate vicinity of the user, the sound per channel is not unique. The human ear hears sound from both channels to both ears at the same time.

FIG. 8B shows the same computer and a computer user with a preferred embodiment of this invention. The perception of sound is the same as in FIG. 8A. There is no distinct advantage of the sound sources being two inches apart versus being eighteen inches apart from the user who is sitting eighteen inches away from the computer.

FIG. 8C shows the same computer and computer user with the separated stereo speakers placed approximately sixty inches apart; i.e thirty inches from the center of the computer. Whilst still maintaining a hundred and fifty degree sweep of the propagating sound waves, the user will now notice a difference in the orientation of the perceived sound. Each ear will now have a direct path to the emanating sound wave from each speaker. Controlling and adjusting the volume of the speakers is of course not very convenient, to say the least.

The following description presents various adaptations and modifications of the invention including what I presently believe to be the best mode for carrying out the invention.

Figure 10:
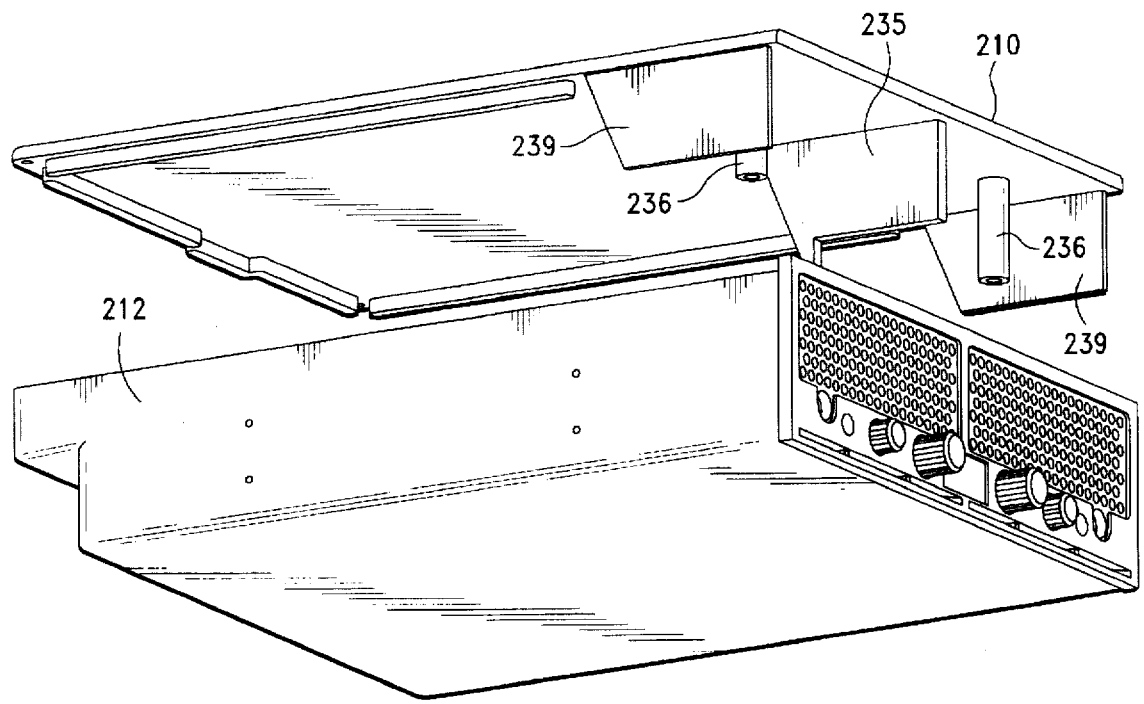
FIG. 10 shows a perspective bottom view of the present embodiment with the top and bottom halves separated.
Figure 11:
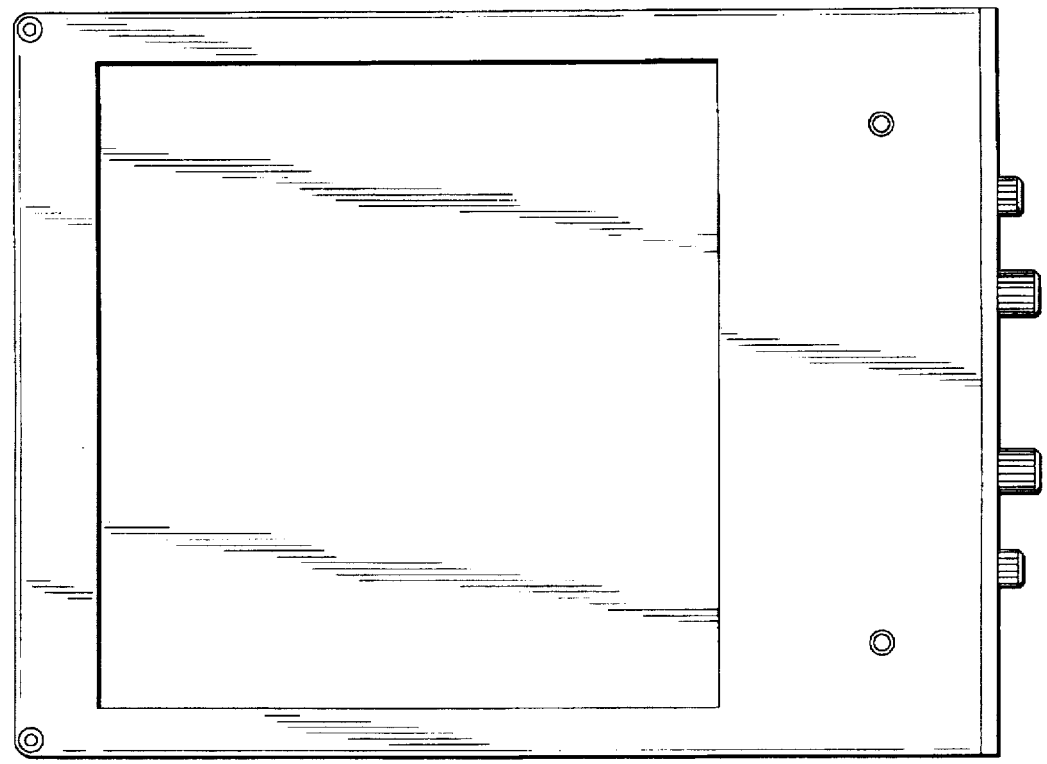
FIG. 11 shows a top view of the present embodiment.

FIG. 10 shows a perspective view of the audio communications system with the top cover 210 separated from the bottom base 212. The two halves 210, 212 are integrated together by screws at holes located at bosses 226, 236. The integrated unit is then installed into a half height disk drive bay of a PC.

In its most basic configuration, the system is configured as an audio communications system. Located in the bottom base 212 is the electronic circuit board 214 (installed with components facing down), speakers 238,240, rear stereo input jack 244, rear stereo output jack 248, rear power receptacle hole 247 and rear PC speaker input jack 246. All electrical connections from the rear of bottom base 212 runs under the speakers 238, 240 and connects to locking headers (not shown) on circuit board 214. Amplified signals from the electronic circuit board 214 also runs under the speakers to connect to the ± terminals of the speakers 238,240.

Figure 15:
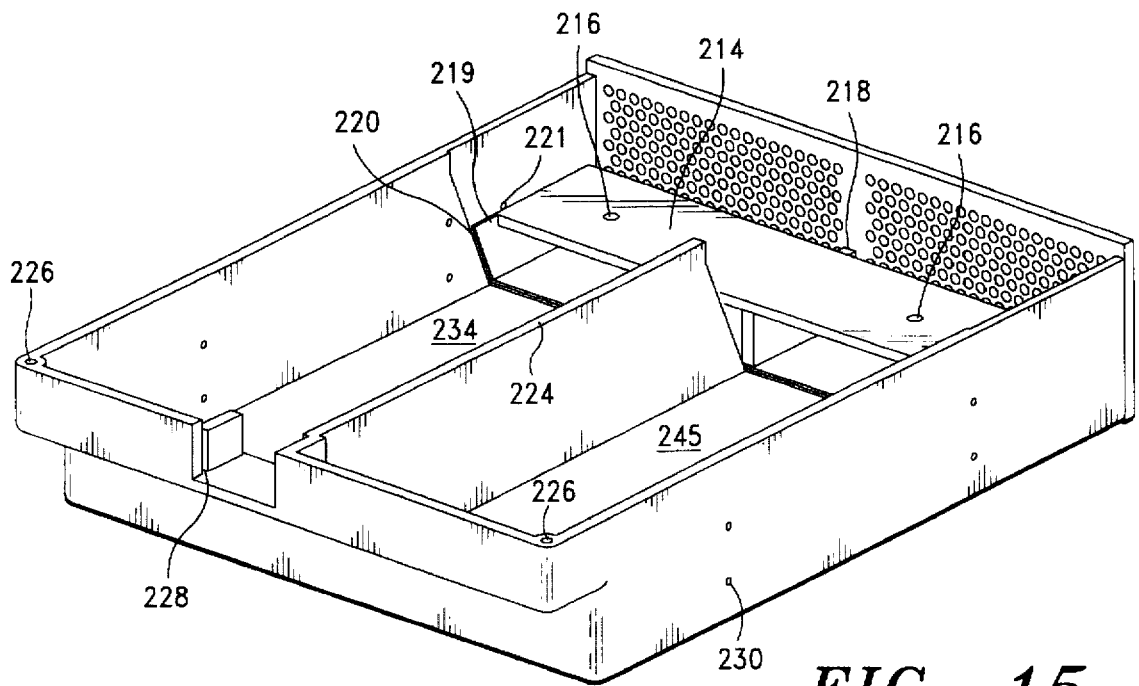
FIG. 15 shows a perspective top view of the bottom half exposing the circuit board with speakers removed.

FIG. 15 shows the bottom base 212 with top cover 210 and speakers 238,240 removed. The circuit board 214 is installed with components facing down and snapped into place and held immobile by left and right indentation 215,219 and left and right mold dimple 223,221. The circuit board 214 is also supported by the front bottom isolation and support structure 218. The electronic components that are soldered onto the electronic circuit board 214 includes the stereo headphone output jack 250, the microphone/audio input stereo jack 264, direct/amplifier switch 252, sound board/PC speaker selection switch 260, right volume control 258, Left volume control 256, Right LED 262, Left LED 252. Bottom base 212 is molded is such a way that the honeycomb shaped holes 268 are part of the same structure. The back bottom isolation and support structure 224 and the power receptacle lock 228 are also integral parts of the bottom base.

FIG. 10 shows the Top cover 210. When top cover 210 is placed onto bottom base 212, the assembly is complete. The front top isolation flap 235,and top side flaps 239 holds down the circuit board 214 in place whilst screws are driven into the bosses 226,236. Front top isolation flap 235 works in conjunction with bottom back isolation support 224 to physically isolate the two audio speakers from each other without the use of any other structures.

Figure 16:
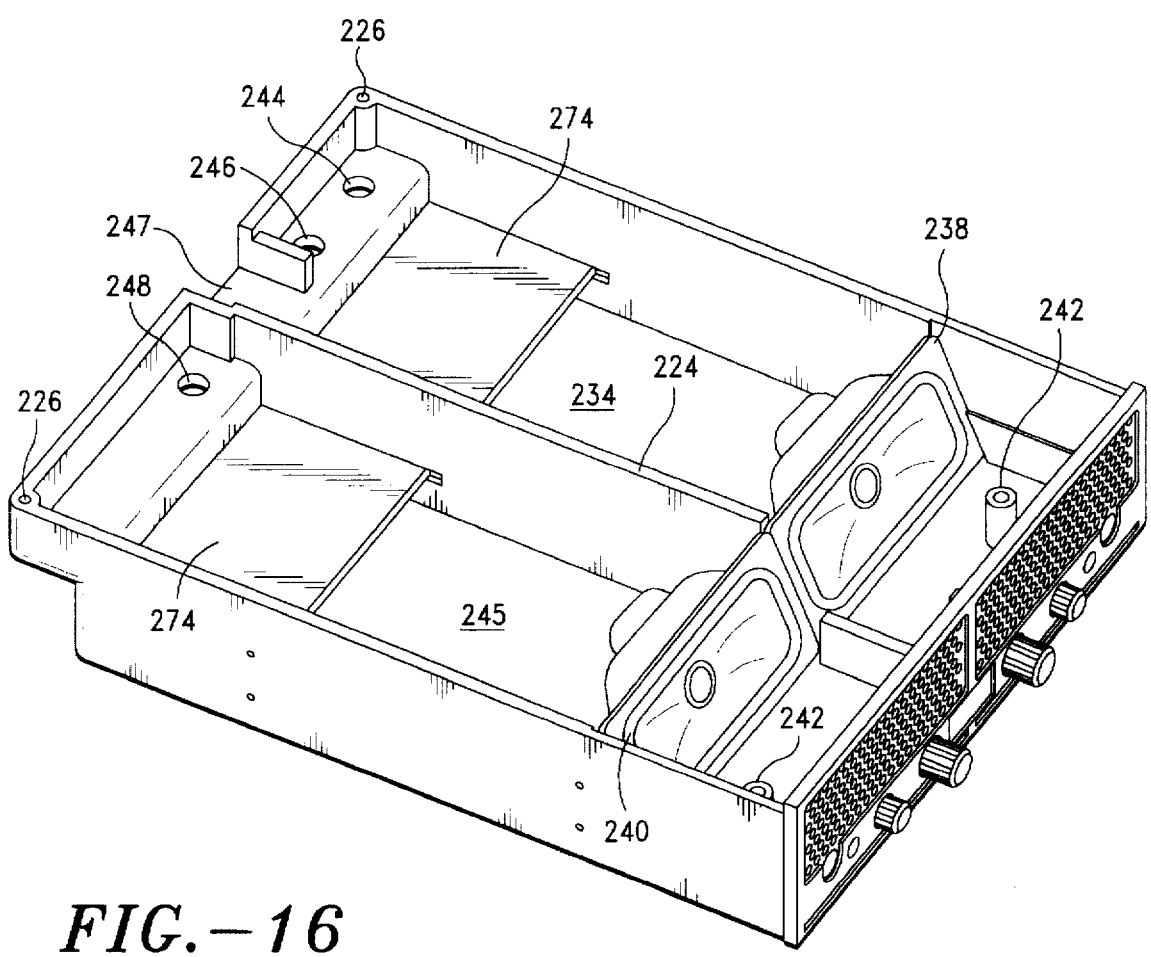
FIG. 16 shows a perspective top view of the bottom half with speakers installed but with circuit board removed and rear modular expansion cards installed but not electrically connected.
Figure 18:
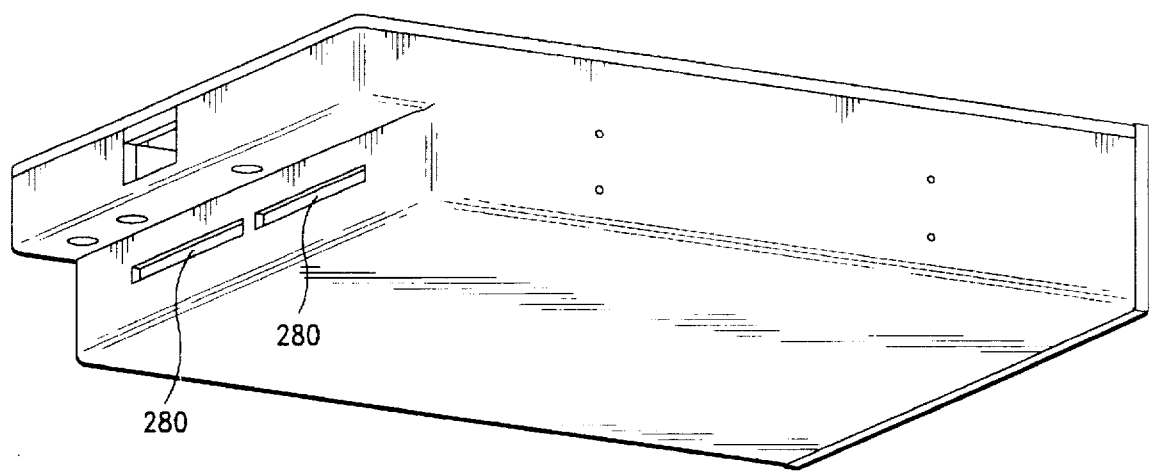
FIG. 18 shows a rear perspective view exposing the rear modular expansion cards access slots.

FIG. 16 shows the bottom base 214 with an application specific modular expansion card 274 inserted through the rear of the system. FIG. 18 shows the location of the modular expansion card access opening at the rear of bottom base 214. The module expansion cards are designed to slide along grooves located along the inner walls of the bottom base 214 assembly (not shown). The expansion cards are electrically connected to the electronic circuit board 214.

FIG. 16 shows a perspective view of the base bottom 212 with the two speakers 238,240 installed. The speakers 238, 240 are installed at an angle approximately 20% from the vertical by sliding through grooves along the inner side walls of bottom base 212. The inner frame of the speakers abutt each other and rests on the similarly sloped back bottom isolation and support 224. The combination of the angled speakers 238,240, front top isolation flap 235, front bottom isolation and support 218 forms two baffles for the two independently controlled audio speakers. Top isolation flap 235 is similarly angled to rest on the inner abutting speaker frames. This angled arrangement results in two advantages: a) There is no need for the speakers to be secured through mounting screws and b.) The angled speaker permits the direction of the reproduced sound waves to traverse the upper top portion of the front panel 269, thereby maintaining the best possible sound quality.

Speaker size design and operation

It is well known that generally, the larger a speaker diaphragm is, the easier it is to reproduce the entire human audio range of typically 20 Hz to 20,000 Hz. The smaller the speakers are, the more difficult it is to reproduce the lower frequency range, typically 20Hz to 300 Hz. This is because, in order to generate Bass response (low frequency) the speaker diaphragm needs to physically move air! In order to maximize the frequency response the speaker surface must be as large as physically possible. A industry standard half height disk drive bay measures roughly 5.5 inches width by 1.6 inches in height. An oval shaped speaker of approximately 1.5 inches by 2.5 inches wide is twice the surface area of a round speaker 1.5 inches in diameter. The two speakers are therefore chosen to be roughly 2.25 inches wide by 1.4 inches in height.

It is also essential that in order for a speaker to operate well, the speaker must be correctly enclosed in an reverberating chamber. For a pair of speakers to function in close proximity to each other, the speakers must also be correctly isolated. Top cover 210 contains angled grooves that when clamped down onto bottom base 212 seals the top edge of the speaker frames to the inside bottom wall of top cover 210. The combination of the elements: top cover 210, side angled grooves of the inner walls 220,222 of the base bottom, back bottom isolation and support 224 and the base of bottom base 212 and the installed speakers themselves ensures that the reveberating chambers 245,234 are created and well isolated.

The speakers are also made from rare earth magnets and are magnetically shielded so that the system does not need additional shielding.

Operation

Figure 14:
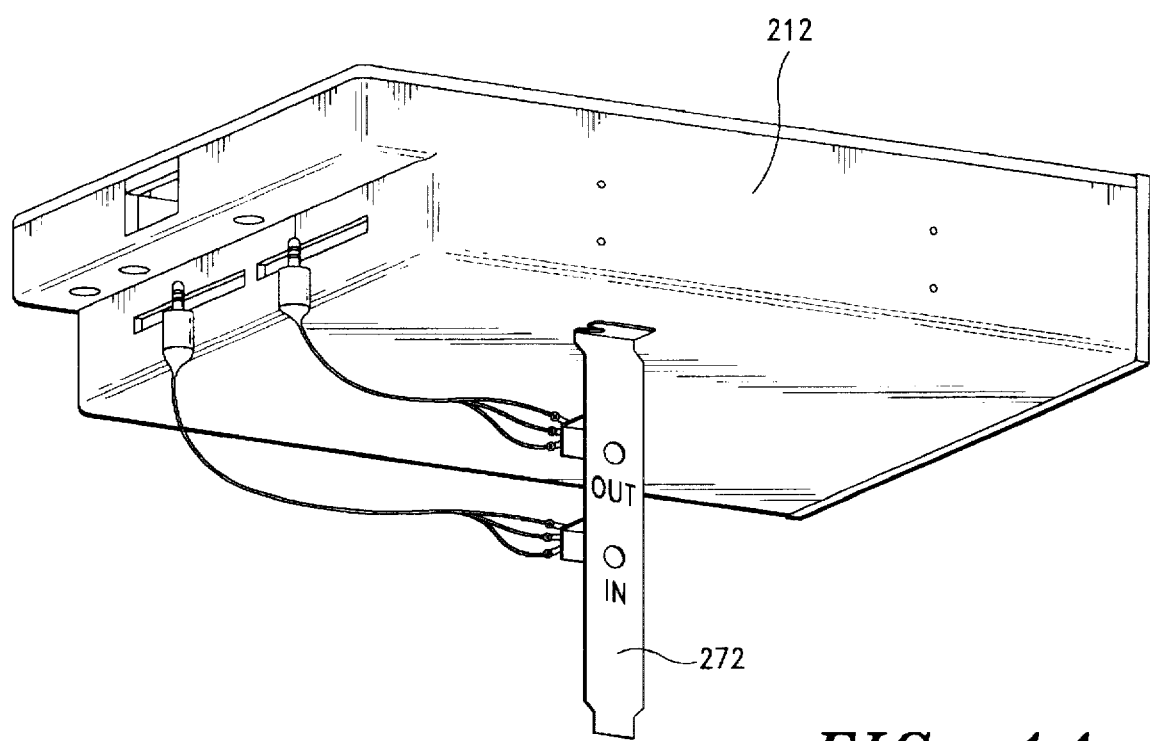
FIG. 14 shows a perspective bottom rear view of the present embodiment showing rear connections to a metal bracket.

The system is first installed into a vacant disk drive bay of a PC. Analog audio signals can be input or output from the system either from the front or through the back of the system. From the front, a microphone source or CD source can be inserted to the system at the microphone/CD input stereo jack 264. From the back, audio signals enter the system through a rear stereo audio jack 244. The PC speaker input is through the rear PC input jack 246. Audio from the front microphone input is 'passed-through' out to the back through the rear stem microphone output jack 248. The back jacks 244,248 are connected to shielded cables to stereo jacks attached to a modified metal bracket that will be installed in a vacant slot of a PC motherboard, as shown in FIG. 14. Sort stereo cables with mini jacks attached to both ends then connect the jacks on the metal brackets to the jacks found on typical sound boards. The PC speaker substitution cable is connected to PC speaker pin found on all motherboards.

Other input/output signals are used in conjunction with the modular expansion cards are described below.

In its basic form, the system accepts audio signals from three sources, namely a.) rear stereo input b.) front stereo input and c.) PC speaker input. The front stereo input source can either be a line in level signal source or a small signal microphone output source. The circuit board 214 contains an electronic amplifier that accepts stereo signal inputs from the above mentioned sources and provides stereo signal amplification of the selected source to the speakers 238,240. Volume control knobs 256,258 allows the user to set the desired volume amplification levels. The Direct Driven/ Amplifier switch 254 allows the user to either amplify the input audio signal using the on board amplifier of circuit board 214 or to totally by pass the amplifier altogether. Application software program then sets the volume directly via the amplifier sources already contained in the Sound Board or PC motherboard. Stereo headphone output jack 250 allows the user to defeat the speakers 238,240 when a quiet environment is to be observed.

During normal audio operation, without an audio source plugged into the microphone/CD input jack 264, the user selects by means of the push button Sound Board/PC speaker switch 260 the desired source of audio for amplification purposes, i.e either the audio source from a Sound Board or the audio source from the PC speaker. When another audio source is inserted into the microphone/CD input stereo jack 264, the PC speaker source is cut-off from the selection procedure, instead the choice is now between selecting the Sound Board or from the front panel microphone/CD input 264. The Sound Board audio source is typically at line in level strength. The microphone/CD input source 264 as the name implies can be a microphone input (dynamic or amplified) or can be a CD line-level input. The invention solves two potential problems in using this combined arrangement of apparent contradiction in signal strength input levels.

Figure 19A:
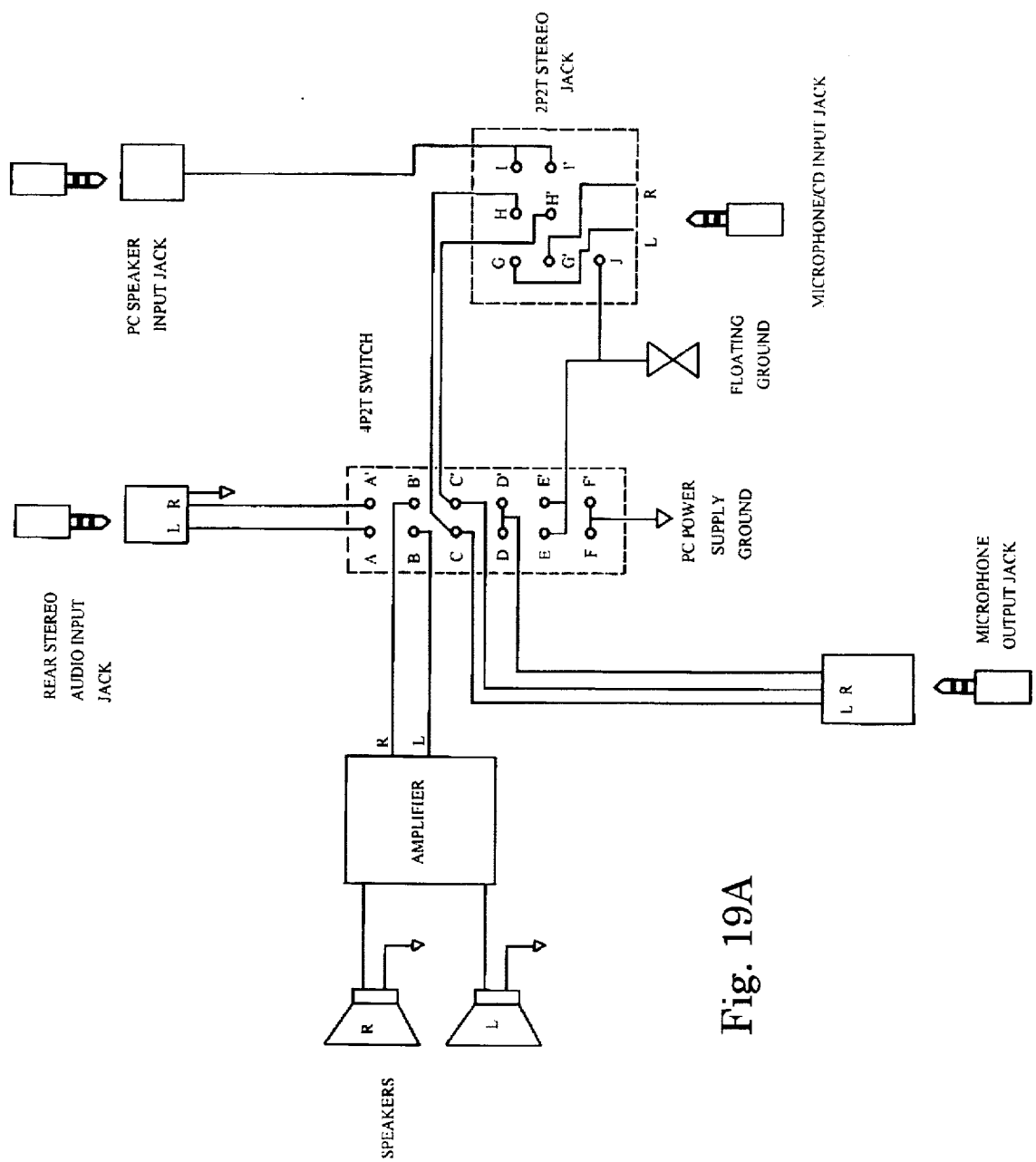
FIG. 19A shows the electrical diagram connecting the 4P2T switch to a 2P2T jack.

A PC power supply electrical ground although electronically regulated at its output is not consistent in its distribution from point to point. From a certain location on the motherboard to another location, say the inside of a hard disk drive, the variations in ground level can be a difference of roughly 400 mV. To a CD input at line level, sharing the same electrical ground with the power supply connector at power receptacle hole 247 is not a problem because the signal to noise ratio is high. For a non amplified microphone to be used in the microphone/CD input jack 264, the small signal nature of the microphone signal will result in a very poor signal to noise ratio if the microphone signal ground is shared directly with the power supply ground. In order to combine the common use of the same input audio stereo jack, a novel mechanical switching and routing method is employed to enable the microphone ground to 'float' when a microphone is used. FIG. 19A shows the electrical diagram of the proposed solution.

Referring to FIG. 19A, a four pole double throw switch (4P2T) is used in conjunction with a two pole double throw (2P2T) stereo jack to provide three input sources of audio (rear stereo audio input, PC speaker input and microphone/ CD front input), a microphone output (microphone pass through) plus routing to the system amplifier, volume controls and stereo headphone output. FIG. 19*b* shows the default as well as the switched positions of the electrical connectors on the 4P2T and the 2P2T stereo jack. On the 4P2T switch, B,B' and E,E' are the common poles. On the 2P2T jack, H, H' are the common poles. F and F' are connected together to the Power supply ground. E and E' are connected together to the common ground node J of the 2P2T jack. This connection is termed the floating ground. With the 2P2T jack in its default position, H is connected to I and H' to I'.

When the 4P2T switch is depressed, the Sound Board audio source is selected, i.e. A is connected to B, A' is connected to B'. Similarly D is connected to E and D' is connected to E'. In this configuration, the amplifier gets its inputs from the Sound Board. If a microphone is also plugged into the microphone/CD jack 264, the microphone signal will be 'passed-through' via the rear stereo microphone output jack 248. The microphone ground will float until it is connected to the ground system of the intended preamplifier be it on the Sound Board or on the PC motherboard, hence the signal to noise ratio is considerably improved from ordinarily tying the microphone ground to the power supply ground of the PC. If a CD line level input is introduced at the same microphone/CD input jack 264, the 4P2T switch is left undepressed, since the Sound Board source is not needed anymore, resulting in the direct connection of the 2P2T common ground node J to the PC power supply ground.

Power is supplied to the system via a industry standard male four pin connector. Stereo mini jacks are used to input and output audio to the system. The Light Emitting Diodes 252,262 are used for three purposes. When audio is played back or recorded the L.E.D's brightness modulates with the frequency of the audio channels creating an aesthetically pleasing rhythm. When audio is not played, the L.E.Ds light up to indicate that power is successfully applied to the system. Thirdly, the L.E.Ds can also flash in synchronisation or flash out of phase with each other to visually indicate messages received by the computer when the system has added functionality that includes electronic mail or voice mail systems (see section on System Expansion).

System Expansion

Figure 12:
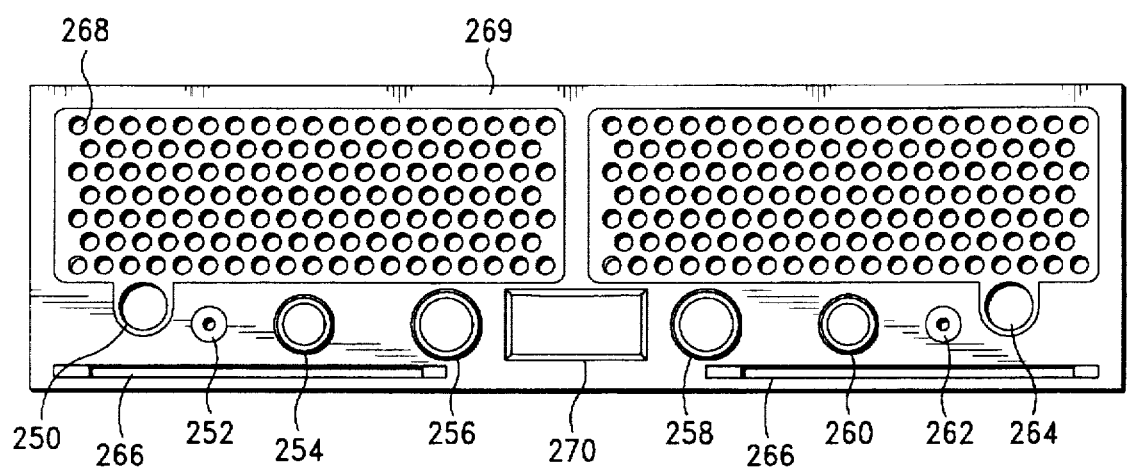
FIG. 12 shows a front view of the present embodiment.
Figure 13:
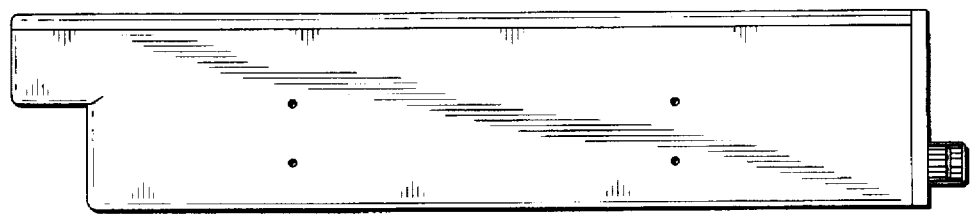
FIG. 13 shows a left side view of the present embodiment.

The basic system is designed to be easily expanded in functionality through the addition of application specific modular expansion cards inserted into the system. Such application specific modular expansion cards includes but not limited to Fax/Data/Voice Modem cards, Radio/Wireless transmission/reception cards, Alarms, data encryption cards, Networking Cards, Telephony/Voice Mail/Electronic Mail cards, Infra-Red/Optical Transmission cards, Video/Audio compression and Digital Signal Processing. Built into the Front panel 269 are front panel access openings 266 see FIG. 12. Similarly the back also contains two such openings 280, see FIG. 18. The application specific modular expansion cards slide into these openings and are electrically connected to the circuit board 214 at the front via a connector soldered to the circuit board 214. The back modular expansion cards also slide in the slot openings 280 and are connected to a rigidly mounted connector connected by flat cabling means to the circuit board 214 (not shown).

Figure 17:
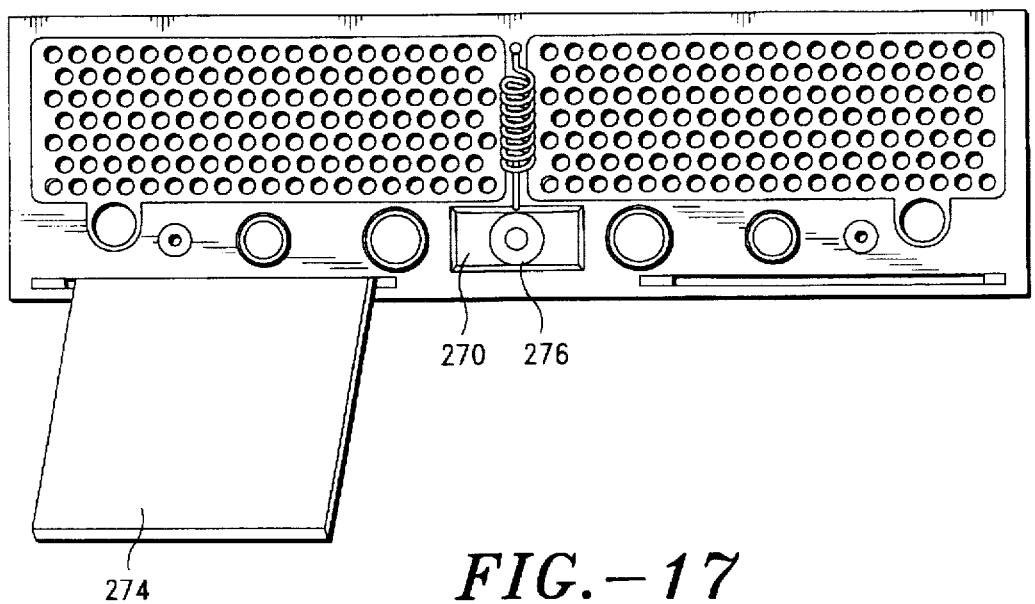
FIG. 17 shows a front view of the present embodiment with a front modular expansion card exposed and installed with a transducer adapter on the front panel.

The transducer adapter mount 270 allows a physical transducer to be inserted for specific adaptations. One such adaptation is shown in FIG. 17 where the transducer adapter is a wireless transmitter/receiver with an optical lens attached to be used in video conferencing. The entire system can thus be configurable for various adaptations by using combinations of modular expansion cards and transducer adapters.

These application modular expansion cards are low profile cards and do not take up an appreciable amount of space.

In the foregoing paragraphs, an embodiment has been described which meets the objects of the invention. The crux of the invention is a sound system adapted for insertion into an existing disk/drive bay of a typical computer taking advantage of an unused space that happens to contain a significant volume of space that can be used by an enclosing chamber to define a reveberating chamber. Also by designing a multifunction frame to cooperate with the reveberating chamber, the sound quality is further improved.

Other variations for the invention may become evident such a scaling the system to occupy two or more unused bays, thereby producing twice the echo capability.

Other arrangements and shapes of the speakers, multifunction frame, and front and back panel design might be adapted, such as a back panel with concave or elliptical walls that reflects sound directly to the focussing channel, or a divider wall design that reflects back radiating sound to the side walls of the back panel.

Other modifications to the firing process may allow installation brackets that screws on the sides of the back panel and enables the sound system to be mounted to the bay at the front.

I claim:

1. An audio communications system for installing into the drive bay of a computer, comprising:

a least one speaker;

means for enclosing, partitioning and isolating a volume of air space contained in said drive bay, thereby creating reveberating chamber for said at least one speaker, the said at least one speaker installed facing a user space to the front and facing said reveberating chamber to the back;

front panel means for enabling a user to interact with said audio communications system;

signal communication means between said audio communications system and said computer;

electrical means for powering said audio communications system from said computer.

2. A computer communications peripheral adapted to fit into a disk drive bay of a computer, comprising:

at least one speaker;

means for enclosing, partitioning and isolating a volume of air space contained in said drive bay, thereby creating reveberating chamber for said at least one speaker, the said at least one speaker installed facing a user space to the front and facing said reveberating chamber to the back;

front panel means for enabling a user to interact with said computer communications peripheral;

expansion means for adding functionality to said computer communications peripheral in response to the insertion of application specific modular expansion cards and transducer adapter means communication means for establishing protocol exchange of data between said computer communications peripheral, said application specific modular expansion cards and said computer;

electrical means for powering said computer communications peripheral from said computer.

3. An audio communications system as in claim 1 wherein a four pole two throw switch is used in conjunction with a two pole two throw stereo jack to provide for two separate grounding planes for use with both a small signal source input such as a dynamic microphone and a large signal line in input onto the same input stereo jack.

4. An audio communications system as in claim 1 wherein a single ended electrical connector is used to substitute the original PC speaker connection on a motherboard to a rear input jack of said audio communications system.

5. An audio communications system as in claim 1 wherein a selection switch is used to select between an audio source from a sound card and the PC speaker.

6. An audio communications system as in claim 3 wherein the the microphone signal is passed-through to the rear without being amplified by the internal amplifier.

7. An audio communications system as in claim 1 wherein the combination of the top cover, bottom base and speakers create, partition and isolate two reveberating chambers for two speakers.

8. An audio communications system as in claim 1 wherein front panel means includes connector means for use of input/output devices, control means for achieving desired audio volume through said speakers, mode selection means for selecting a plurality of modes and amplifier means for signal amplification.

9. A computer communications peripheral as in claim 2 wherein protocol communications between said computer communications peripheral, said application specific modular expansion cards and said computer is defined by the application software.

10. A computer communications peripheral as in claim 2 wherein said front panel communications means includes connector means for use with input/output devices, control means for achieving desired signal input/output levels, mode selection means for selecting a plurality of modes, status means for enabling said peripheral to emit flashing message lights in response to commands from said computer.

11. The application specific modular expansion cards as in claim 9 wherein such cards may be of the PCMCIA type.

12. A computer communications peripheral as in claim 2 wherein said transducer adapter means is a transducer plugged into said front panel, adapted to perform various input/output functions not limited to wireless, optical, infrared and magnetic transmission/reception.

13. A computer communications peripheral as in claim 11 wherein said application specific modular expansion cards may include functions such as but not limited to fax/data/voice modem, telephony, wireless, Voice Mail/E-mail, Audio/Video compression, Digital Signal Processing and data encryption.

14. An audio communications system as in claim 1 wherein said audio communications system is installed into said drive bay having a height less than 4.0 cm, a width less than 15 cm, and a depth less than 20 cm by screws installed on the sides.

15. A computer communications peripheral as in claim 2 wherein said application specific modular expansion cards and said transducer adapter means are electrically connected to and powered by the main circuit board.

16. An audio communications system as in claim 1 wherein the speakers are substantially rectangular and mounted approximately 20 degrees angle from the vertical.

17. An audio communications system as in claim 1 wherein the L.E.Ds are frequency modulated to the amplified signals.

18. A computer communications peripheral as in claim 2 wherein the L.E.Ds are frequency modulated to the amplified audio signals in the audio mode but act as message flashing lights when computer commands are received.

19. An audio communications system as in claim 16 wherein said speakers are made of rare earth elements and are completely shielded from emitting electromagnetism.

20. An computer communications peripheral as in claim 2 wherein the main circuit board has connectors connecting said application specific modular expansion cards and said transducer adapters.

* * * * *

UNITED STATES PATENT AND TRADEMARK OFFICE
CERTIFICATE OF CORRECTION

PATENT NO. : 5710821

DATED : Jan. 20, 1998

INVENTOR(S) : Chris C Cheah

It is certified that error appears in the above-indentified patent and that said Letters Patent is hereby corrected as shown below:

After column 14, line 32, the following additional claims should be included.

21. A sound system for installation into the bay of a computer for radiating sound into a space occupied by a user which comprises:
a front panel means with at least one speaker hole and having a mouth hole and having a front panel face facing said user space and a back panel face facing opposite said user space and facing a reverberating space;
    a speaker means mounted onto said front panel means adjacent said least one speaker hole and having a front speaker face facing said user space and a rear speaker face facing reverberating space permitting said speaker to radiate sound into said user space and said reverberating space;
    a focusing means having a throat originating in said reverberating space and a mouth opening into said user space;
    said front panel means, speaker means and focusing means having dimensions and assembled together in operable combination to fit and installed into said bay.

22. A sound system for installation into the bay of a computer for radiating sound into a space occupied by a user which comprises:
a housing means with an opening and enclosing a reverberating chamber having dimensions selected to permit installing said housing into said bay;
    a front panel means secured to said housing over said opening and having at least one speaker hole and having a mouth hole and having a front panel face facing said user space and a back panel face facing opposite said user space and facing said reverberating space;
   at least one speaker mounted into said front panel means adjacent said at least one speaker hole, each said at least one speaker having a front speaker face facing said user space and a rear speaker face facing said reverbound into said user space and said reverberating space;
    a focusing isolation means having a throat originating in said reverberating space and a mouth opening coincident with said mouth hole constructed and arranged in operable combination with said housing means, front panel means, and at least one speaker means to prevent destructive interference of sound waves emanating from said at least one speaker that would otherwise diminish reverberating sound waves in said reverberating chamber.

UNITED STATES PATENT AND TRADEMARK OFFICE
CERTIFICATE OF CORRECTION

| | | |
|---|---|---|
| PATENT NO. : | 5710821 | |
| DATED : | Jan. 20, 1998 | |
| INVENTOR(S) : | Chris C Cheah | |

It is certified that error appears in the above-indentified patent and that said Letters Patent is hereby corrected as shown below:

23. A method for producing enriched sound from a system, including a computer with an existing disk drive bay which includes the steps:
    installing in said bay a sound system comprising a housing having an opening and enclosing a chamber having dimensions selected to permit installing said housing in said bay, a front cover means covering said opening, a speaker means, an amplifier means, an isolation means and a focusing means, all constructed and assembled in operable combination to provide that sound generated by said speaker means will reverberate in said chamber thereby producing said enriched sound.

24. A sound system as in claim 21 which comprises a housing means with an opening and with said front panel means secured over said opening such as with said housing to enclose said reverberating space.

25. A sound system as in claim 24 wherein said housing is substantially rectangular having a height less than 4.0 cm, a width less than 15 cm. and depth less than 20 cm. and wherein said opening is less than 4.0 cm by 15 cm.

26. A sound system as in claim 24 wherein said housing comprises an interior surface lined with ferromagnetic material thereby dampening electromagnetic radiation in said reverberating space.

27. A sound system as in claim 21 wherein said speaker means comprises two speakers.

28. A sound system as in claim 27 wherein said mouth is positioned between said speakers.

29. A sound system as in claim 28 wherein said focusing system comprises:
    a channel with said throat at one end of said channel and said mouth at an opposite end of said channel; said channel being formed by two vertical panels mounted to a frame;
    means for joining said frame to said front panel at said mouth end coincident with said mouth opening.

30. A sound system as in claim 29 wherein said vertical panels also act to isolate back radiating sound waves in the immediate vicinity of said speakers to prevent destructive interference.

UNITED STATES PATENT AND TRADEMARK OFFICE
CERTIFICATE OF CORRECTION

| | |
|---|---|
| PATENT NO. : | 5710821 |
| DATED : | Jan. 20, 1998 |
| INVENTOR(S) : | Chris C Cheah |

It is certified that error appears in the above-indentified patent and that said Letters Patent is hereby corrected as shown below:

31. A sound system as in claim 21 which comprises a pair of amplifier means, one amplifier means secured to one said speaker means respectively 32. A sound system as in claim 27 which comprises an amplifier means for each speaker for receiving an incoming signal from a third party source independent of said other amplifier.

33. A sound system as in claim 32 wherein each said amplifier means has an impedance and said amplifier means comprises an impedance matching means.

34. A sound system as in claim 33 wherein said impedance matching means comprises an impedance having a value less than 5 ohms, an impedance greater than 200 ohms and means for applying said incoming signal directly to said amplifier means and a switch means for enabling a user to selectively match said impedance of said third party signal source.

35. A sound system as in claim 24 which comprises means for securing said housing in said drive bay.

36. A sound system as in claim 21 wherein said bay comprises at least one half height, approximately 15 cm (W) x 4.5 cm (H) x 18 cm (L).

UNITED STATES PATENT AND TRADEMARK OFFICE
CERTIFICATE OF CORRECTION

| | |
|---|---|
| PATENT NO. : | 5710821 |
| DATED : | Jan. 20, 1998 |
| INVENTOR(S) : | Chris C Cheah |

It is certified that error appears in the above-indentified patent and that said Letters Patent is hereby corrected as shown below:

37. A sound system as in claim 29 which comprises means connected to said amplifier for receiving power such as would be available from a computer power source.

38. A sound system as in claim 37 wherein said power receiving means comprises a noise filtering means for filtering out noise from power delivered to said amplifier means such as would be available from said computer power source.

39. A sound system as in claim 21 wherein said amplifier means comprises a stereo headphone jack in operable combination with said speaker means to provide that when a stereo headphone plug is inserted into said stereo headphone jack, said speaker means is disconnected from said amplifier means.

40. A method as in claim 23 which includes the additional step of connecting power from said computer to said amplifier means.

Signed and Sealed this

Twelfth Day of January, 1999

Attest:

Attesting Officer

*Acting Commissioner of Patents and Trademarks*